United States Patent [19]
Takei et al.

[11] Patent Number: 5,958,614
[45] Date of Patent: Sep. 28, 1999

[54] FUEL CELL GENERATING SET INCLUDING LYSHOLM COMPRESSOR

[75] Inventors: Noburou Takei, Urayasu; Shigeru Takabe, Sagamihara, both of Japan

[73] Assignee: Ishikawajima-Harima Heavy Industries Co., Ltd., Tokyo, Japan

[21] Appl. No.: 08/899,272

[22] Filed: Jul. 23, 1997

[30] Foreign Application Priority Data

Dec. 27, 1996 [JP] Japan .................................. 8-351192

[51] Int. Cl.⁶ .................................................. H01M 8/04
[52] U.S. Cl. ........................................................ 429/26
[58] Field of Search ................................. 429/19, 20, 26, 429/12

[56] References Cited

U.S. PATENT DOCUMENTS

| | | | |
|---|---|---|---|
| 2,115,338 | 4/1938 | Lysholm | 60/42 |
| 2,519,913 | 10/1950 | Lysholm | 230/143 |
| 3,850,554 | 11/1974 | Zimmern | 418/84 |
| 4,020,642 | 5/1977 | Haselden et al. | 62/84 |
| 4,087,976 | 5/1978 | Morrow, Jr. et al. | 60/643 |
| 4,622,275 | 11/1986 | Noguchi et al. | 429/19 |
| 4,820,594 | 4/1989 | Sugita et al. | 429/17 |
| 4,921,765 | 5/1990 | Gmeindl et al. | 429/16 |
| 4,923,768 | 5/1990 | Kaneko et al. | 429/19 |
| 5,094,926 | 3/1992 | Kobayashi et al. | 429/20 |
| 5,208,114 | 5/1993 | Uematsu et al. | 429/20 |
| 5,221,586 | 6/1993 | Morimoto et al. | 429/20 |
| 5,360,679 | 11/1994 | Buswell et al. | 429/19 |
| 5,432,020 | 7/1995 | Fleck | 429/13 |
| 5,434,016 | 7/1995 | Benz et al. | 429/13 |
| 5,715,673 | 2/1998 | Beichel | 60/39.07 |

OTHER PUBLICATIONS

"Transportation Polymer Electrolyte Fuel Cell Systems for Different On–Board Fuels" by H. K. Geyer et al, Argonne National Laboratory, Argonne, Illinois, pp. 483–486.

"Development of a PEM Fuel Cell System for Vehicular Application" by H. E. Helms et al, General Motors Corp., No. 921541, pp. 1–9.

*Primary Examiner*—Maria Nuzzolillo
*Assistant Examiner*—Jonathan Crepeau
*Attorney, Agent, or Firm*—Griffin, Butler, Whisenhunt & Szipl, LLP

[57] ABSTRACT

There is provided a fuel cell generating set including (a) a fuel cell, (b) a Lysholm compressor, (c) a gas-liquid separation apparatus condensing humidity generated in the fuel cell into water and retaining the thus-produced water therein, and (d) an injection pump for injecting the water to an intake port of the Lysholm compressor. The water exchanges heat with air under pressure in the Lysholm compressor to thereby cool air to be discharged from the Lysholm compressor by latent heat of vaporization. The water injected from the injection pump seals a leakage path in the Lysholm compressor. The above-mentioned generating set enhances volumetric efficiency and temperature efficiency of a Lysholm compressor, which ensures that the generating set can operate with less power and the generating set can be made smaller in size and lighter in weight. In addition, it is not necessary to supply water to the generating set, because the generating set is self-sufficient with respect to water.

4 Claims, 3 Drawing Sheets

FUEL CELL GENERATING SET INCLUDING LYSHOLM COMPRESSOR

BACKGROUND OF THE INVENTION

1. Field of the Invention

The invention relates to a fuel cell generating set, and more particularly to a fuel cell generating set including a Lysholm compressor for compressing air for a fuel cell. For instance, the generating set in accordance with the invention can be applied to an electric automobile.

2. Description of the Prior Art

Nowadays, an Otto cycle or Diesel cycle internal combustion engine has been used as an automobile engine. They are compact, but ZEV (zero emission vehicles) such as an electric automobile are expected to develop from the standpoint of regulation of exhaust gas such as $NO_x$, fine particles, CO and $CO_2$. As example of ZEV, fuel cell vehicles and battery-powered vehicles are now being developed in several countries.

FIG. 1 is a block diagram of a conventional fuel cell automobile. The illustrated automobile includes a fuel tank 1, a fuel processing device 2, a fuel cell 3, a battery 4, a power controller 5, a motor 6 for driving a drive shaft, and a wheel driving mechanism 7. Fuel such as methane and methanol is stored in the fuel tank 1. The fuel processing device 2 reforms fuel stored in the fuel tank 1 into a fuel gas containing hydrogen therein. Receiving the thus reformed fuel, the fuel cell 3 generates electricity, by which the motor 6 is driven. Thus, wheels are driven by means of the wheel driving mechanism 7. The battery 4 is used as a starter, and the power controller 5 controls the operation of the automobile. The fuel processing device 2 may be omitted, in which case hydrogen gas stored in the tank 1 is directly supplied into the fuel cell 3.

In the above-mentioned conventional fuel cell automobile, it is necessary to operate a fuel cell under pressure and supply pressurized air at 3 to 4 atm. Into the fuel cell, in order to make the fuel cell smaller in size and enhance performance of the fuel cell. Thus, there is a need for an air source having a smaller air capacity, a higher pressure ratio, and a higher efficiency, to be used for a small-sized fuel cell system.

There has been conventionally employed a two-stage supercharger using a turbo-charger therein, as an air source for such a fuel cell system. However, two-stage compression has problems that in that it is unavoidable that the compressor complicated in structure, and efficiency is thus deteriorated. On the other hand, a Lysholm compressor could provide pressurized air having a compression ratio equal to or greater than 3 in a single compression type. However, when a Lysholm compressor is used in a fuel cell, there are problems to be solved, as follows.

Firstly, a Lysholm compressor provides a high efficiency in a usually used revolution range, however, volumetric efficiency is significantly deteriorated because of leakage between rotors, when a gas quantity used is quite small.

Secondly, temperature rise in air caused by single compression deteriorates temperature efficiency, and thus poses a problem that greater power is required to operate the Lysholm compressor.

Thirdly, a discharge temperature is beyond 200° C. because of single compression. Thus, a rotor and a casing have to be made of iron or other similar materials, resulting in an increase in weight.

SUMMARY OF THE INVENTION

In view of the above mentioned problems of prior generating sets, it is an object of the present invention to provide a generating set which is capable of enhancing volumetric efficiency and temperature efficiency, and thus decreasing power for operating the generating set and making it possible to fabricate a generating set in smaller size and in smaller weight.

According to the invention, there is provided a generating set including (a) a fuel cell, (b) a Lysholm compressor, (c) a gas-liquid separation apparatus condensing humidity generated in the fuel cell into water and retaining the thus produced water therein, and (d) an injection pump for injecting the water to an intake port of the Lysholm compressor. The water exchanges heat with air under pressure in the Lysholm compressor to thereby cool air to be discharged from the Lysholm compressor by latent heat of vaporization. The water injected from the injection pump seals a leakage path in the Lysholm compressor.

Water injected into an intake port of the Lysholm compressor cools air down to thereby enhance a temperature efficiency and total adiabatic efficiency. In addition, the water seals the leakage path of the Lysholm compressor to thereby enhance volumetric efficiency, ensuring operation efficiency in a small gas quantity range. Air to be discharged out of the Lysholm compressor is cooled down by latent heat of vaporization of water to thereby decrease the temperature of the air. Hence, it is possible to make a rotor and a casing of light metal such as aluminum, ensuring a smaller weight of the generating set, which is advantageous when the generating set is mounted on an automobile. In addition, humidity generated in the fuel cell is condensed into water, and the thus-produced water is used for injecting into an intake port of the Lysholm compressor. Thus, it is not necessary to supply water to the generating set, ensuring easier maintenance. The thus-produced water is pure water, and hence the Lysholm compressor is not influenced by deposits such as fur which is often present in water. Accordingly, the Lysholm compressor can have enhanced volumetric efficiency and temperature efficiency, which ensures that the generating set can be operated with smaller power, and that the generating set can be made smaller in size and lighter in weight.

In a preferred embodiment, the Lysholm compressor is driven by an electric motor which is driven by electricity produced by the fuel cell. For instance, the electric motor is a driving motor for an electric automobile. This embodiment ensures that an additional driving unit is not required, and hence the generating set can be made in smaller in size and lighter weight.

In another preferred embodiment, the said Lysholm compressor produces a pressure of about 350 kPa.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENT

Figure 2:
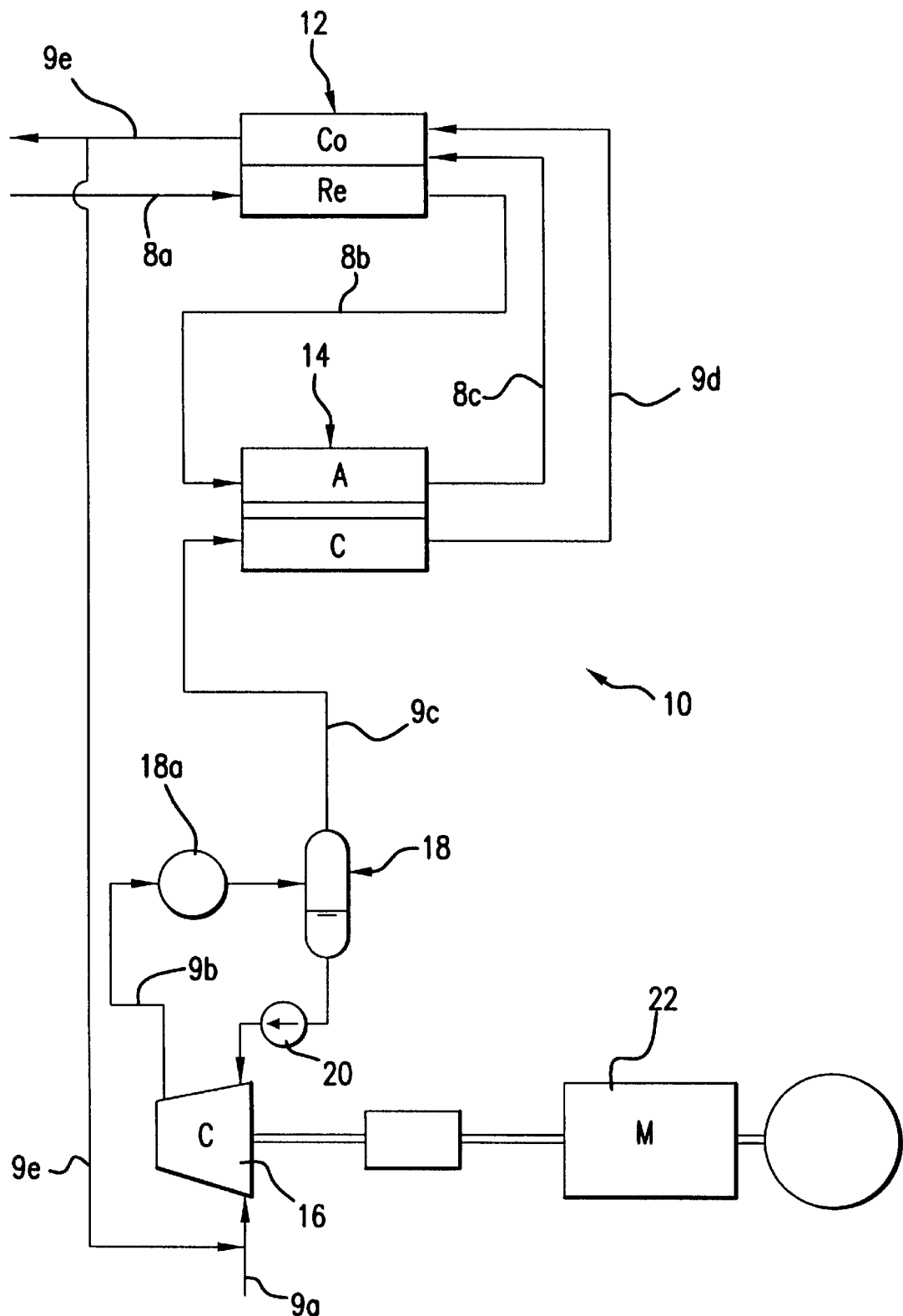
FIG. 2 is a schematic view of a fuel cell generating set in accordance with the present invention.

A Preferred embodiment in accordance with the present invention will be explained hereinbelow with reference to drawings. FIG. 2 illustrates a fuel cell generating set in accordance with the present invention. The illustrated fuel cell generating set 10 is comprised of a reformer 12, a fuel cell 14 and a Lysholm compressor 16.

The reformer 12 is a plate type reformer comprising a planar reform chamber Re and a combustion chamber Co. The reform chamber Re is filled with reforming catalyst, and the combustion chamber Co is filled with combustion catalyst. The reform chamber Re receives heat from the combustion chamber Co, and utilizes the thus-received heat to reform fuel gas 8a into anode gas 8b containing hydrogen therein. There may be employed conventional reformers in place of the plate type reformer 12.

The fuel cell 14 is comprised of stacked cells, and each cell is comprised of a planar anode A, a cathode C, and an electrolytic plate sandwiched between the anode A and the cathode C. The fuel cell 14 receives the anode gas 8b containing hydrogen therein and cathode gas 9c containing oxygen therein, and electrochemically generates electricity from them. Anode exhaust gas 8c and cathode exhaust gas 9d having passed through the fuel cell 14 are introduced into the combustion chamber Re of the reformer 12, and are completely burned by the reformer catalyst and discharged as exhaust gas 9e.

As the fuel cell 14, there may be used a molten carbonate fuel cell, a solid polymer fuel cell, or a phosphoric acid fuel cell. Reaction occurring in any of the above mentioned fuel cells is one in which hydrogen reacts with oxygen to thereby generate water. The exhaust gas 9e contains a lot of water vapor. Some of the exhaust gas 9e is released into atmosphere, and the remaining is supplied to an intake port of the Lysholm compressor 16.

Figure 3:
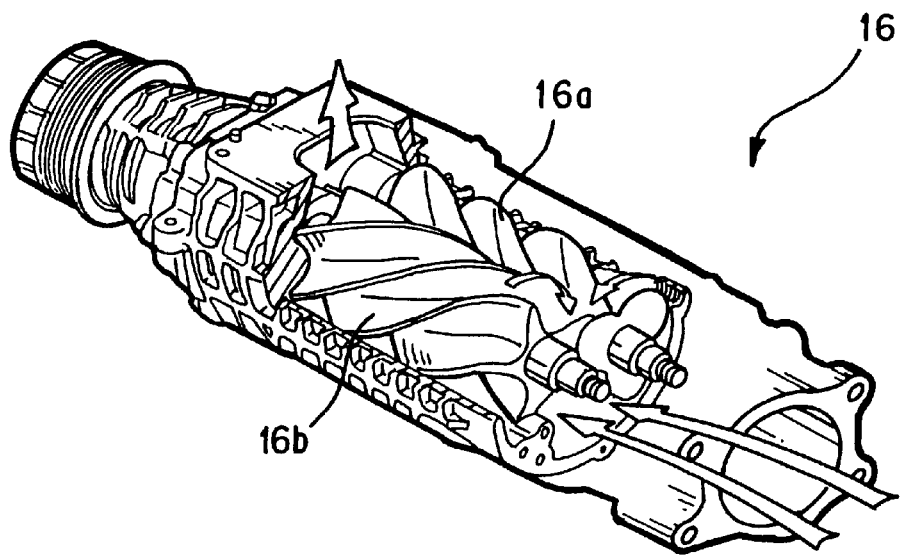
FIG. 3 is a perspective view of a Lysholm compressor.

FIG. 3 is a perspective view of the Lysholm compressor 16. As illustrated, the Lysholm compressor 16 is comprised of a male rotor 16a and a female rotor 16b disposed in parallel with each other. Each of the rotors 16a and 16b axially rotate at a high speed, and axially transfer air. Since a spacing between the rotors 16a and 16b is arranged axially narrower, the thus-transferred air is compressed. That is, the Lysholm compressor 16 is a screw compressors. The Lysholm compressor can rotate at a couple of tens of thousands of rpm, and can generate a high pressure of about 160 kPa in a single compression. That is, the Lysholm compressor is a small-sized compressor with a high efficiency. A pressure ratio for practical use is higher, and hence it is preferable that the Lysholm compressor provides a pressure ratio of about 3.5, and namely generates a high pressure of about 350 kPa, when used for a fuel cell.

Figure 1:
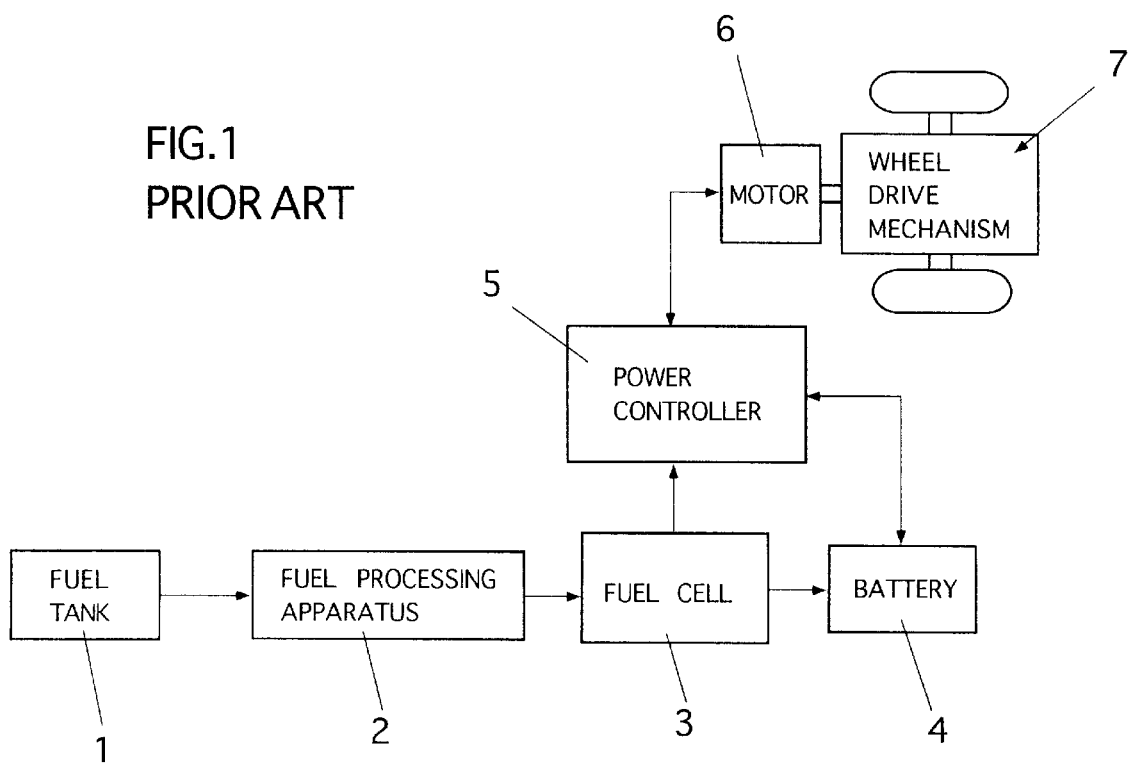
FIG. 1 is a block diagram of a conventional fuel cell automobile.

As illustrated in FIG. 2, the Lysholm compressor 16 is driven by an electric motor 22, which is in turn driven with electricity generated in the fuel cell 14. That is, the electric motor 22 corresponds to a drive motor (namely, the motor 6 in FIG. 1) of an electric automobile. Since an amount of generated electricity is not always consistent with a speed of an automobile, the Lysholm compressor 16 may be driven by another drive motor.

The fuel cell generating set 10 further includes a gas-liquid separation apparatus 18 condensing humidity generated in the fuel cell 14 into water and retaining the thus produced water therein, and an injection pump 20 for injecting the water to an intake port of the Lysholm compressor 16 from the gas-liquid separation apparatus 18. The gas-liquid separation apparatus 18 is provided with an air-cooling condenser 18a.

The Lysholm compressor 16 absorbs ambient air 9a together with the exhaust gas 9e supplied from the reformer 12, and compresses them. The thus-compressed exhaust gas 9b is supplied to the condenser 18a. Water produced in the condenser 18a is stored in the gas-liquid separation apparatus 18, and mixture gas 9c separated from water in condensation in the condenser 18a is supplied into the fuel cell 14 as cathode gas. Thus, it is possible to collect water vapor generated in the fuel cell 14, and recirculate carbon dioxide ($CO_2$) required for reaction in the fuel cell 14.

The injection pump 20 injects water to an intake port of the Lysholm compressor 16. The thus injected water exchanges heat with pressurized air in the Lysholm compressor 16 to thereby cool air to be discharged from the Lysholm compressor by latent heat of vaporization, and at the same time seals a leakage path in the Lysholm compressor 16.

Figure 4:
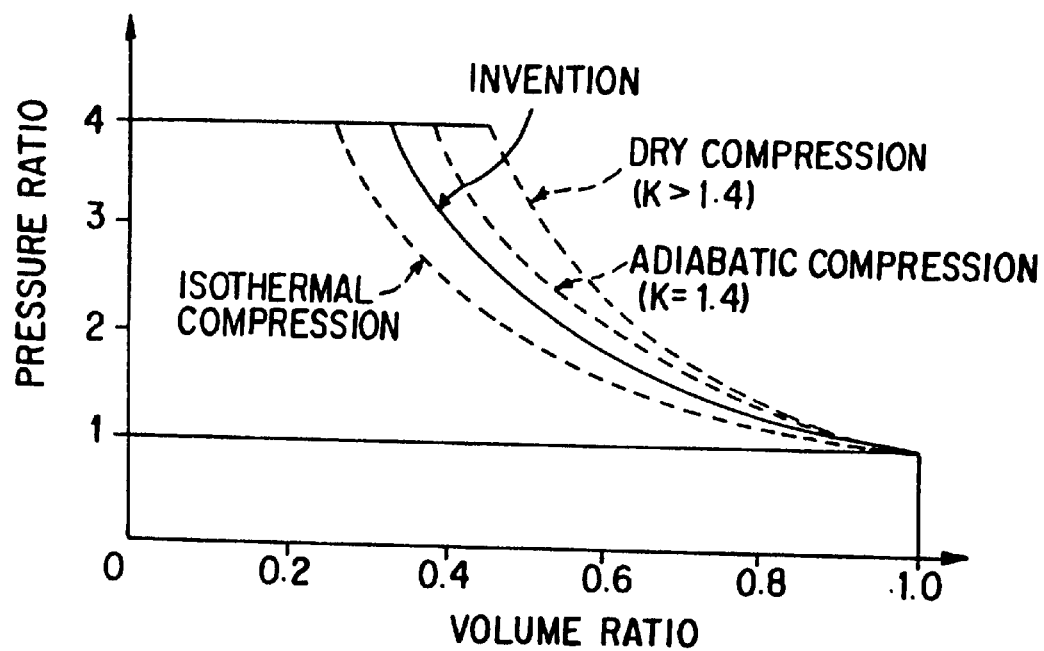
FIG. 4 is a graph showing characteristics of the Lysholm compressor in the present invention.

FIG. 4 is a graph showing the characteristic of the Lysholm compressor 16. The ordinate axis indicates a pressure ratio, and the abscissa axis indicates a pressure ratio. As illustrated, the Lysholm compressor 16 can accomplish the compression closer to the ideal isothermal compression than dry compression ($k>1.4$) and adiabatic compression ($k=1.4$), by virtue of cooling by water injection. Thus, it is possible to reduce power required for compression.

As mentioned earlier, water injected to an intake port of the Lysholm compressor cools air down to thereby enhance temperature efficiency and total adiabatic efficiency. In addition, the water seals the leakage path of the Lysholm compressor to thereby enhance volumetric efficiency, ensuring operation efficiency in a small gas quantity range. Air to be discharged out of the Lysholm compressor is cooled down by latent heat of vaporization of water to thereby decrease the temperature of the air. Hence, it is possible to make a rotor and a casing of light metal such as aluminum, ensuring a smaller weight of the generating set, which is advantageous when the generating set is mounted on an automobile. In addition, humidity generated in the fuel cell is condensed into water, and the thus-produced water is injected into an intake port of the Lysholm compressor. Thus, it is not necessary to supply water to the generating set, ensuring easier maintenance. The thus produced water is pure water, and hence the Lysholm compressor is not influenced by deposits such as fur which are often present in water. Accordingly, the Lysholm compressor can have enhanced volumetric efficiency and temperature efficiency, which ensures that the generating set can be operated with smaller power, and that the generating set can be made smaller in size and lighter in weight.

In accordance with the above mentioned fuel cell generating set including a Lysholm compressor, it is possible to enhance volumetric efficiency and temperature efficiency, and thus decrease the power required for operating the generating set. Hence, the generating set can be made smaller in size and lighter in weight. In addition, the generating set in accordance with the present invention has an advantage that it is not necessary to supply water thereto, because the generating set is self-sufficient with regard to water.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A fuel cell generating set comprising:

(a) a fuel cell;

(b) a Lysholm compressor;

(c) a gas-liquid separation apparatus condensing humidity generated in said fuel cell into water and retaining the thus-produced water therein; and (d) an injection pump for injecting said water into an intake port of said Lysholm compressor, said water exchanging heat with air under pressure in said Lysholm compressor to thereby cool air to be discharged from said Lysholm compressor by latent heat of vaporization, said water injected from said injection pump sealing a leakage path in said Lysholm compressor.

2. The fuel cell generating set as set forth in claim 1, wherein said Lysholm compressor is driven by an electric motor which is driven by electricity produced by said fuel cell.

3. The fuel cell generating set as set forth in claim 1, wherein said Lysholm compressor produces a pressure of about 350 kPa.

4. The fuel cell generating set as set forth in claim 2, wherein said Lysholm compressor produces a pressure of about 350 kPa.

* * * * *